Nov. 6, 1951   W. D. MITCHELL   2,573,802
POULTRY WATER FOUNTAIN
Filed March 17, 1950
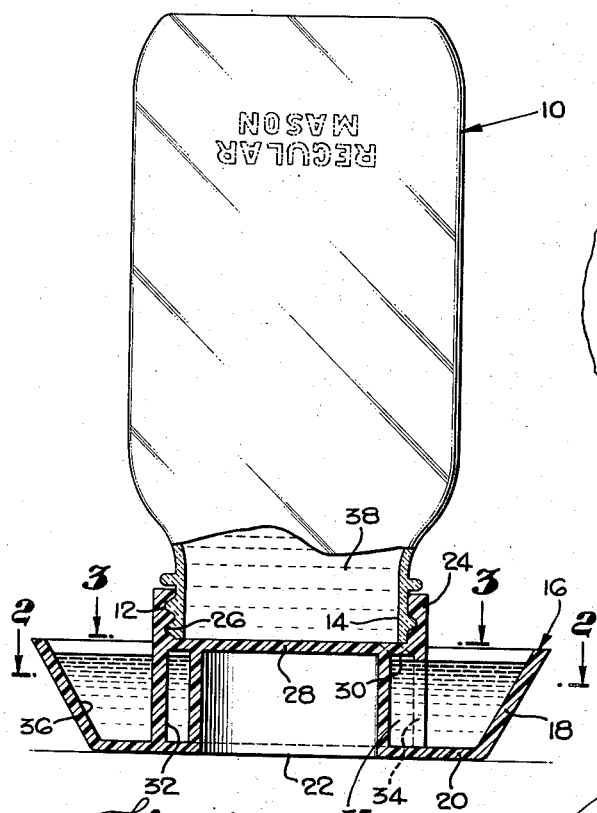
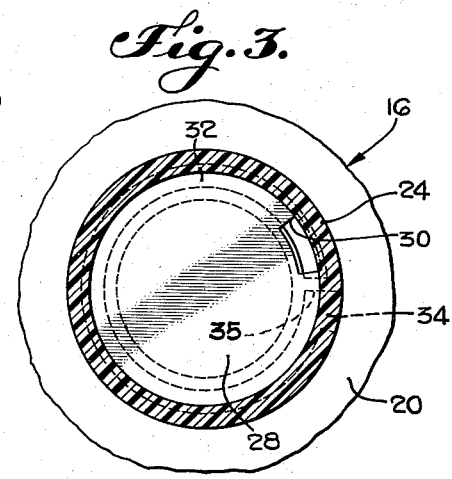
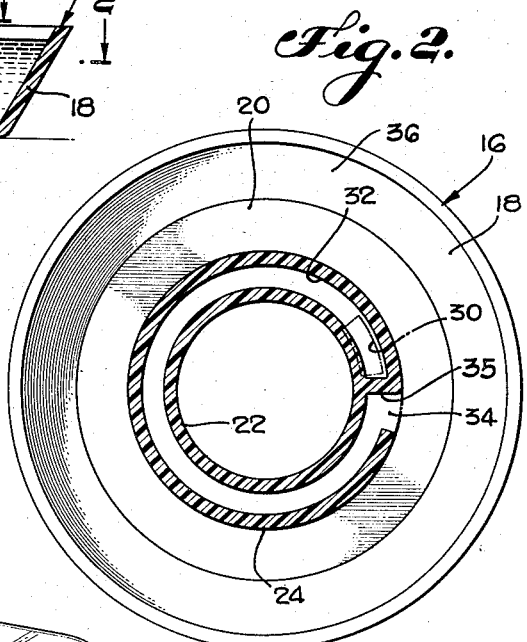
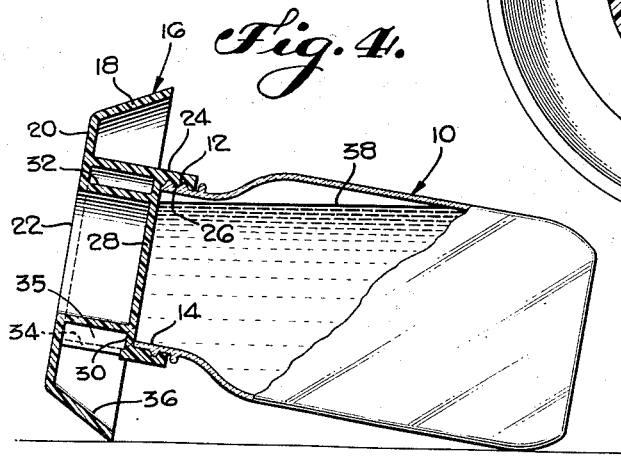
WILEY D. MITCHELL, INVENTOR.
ATTORNEY Patented Nov. 6, 1951

2,573,802

UNITED STATES PATENT OFFICE 2,573,802

POULTRY WATER FOUNTAIN

Wiley D. Mitchell, Highgrove, Calif.

Application March 17, 1950, Serial No. 150,201

5 Claims. (Cl. 119—77)

My invention relates to an improved water fountain for furnishing drinking water to poultry and domestic animals.

In previous fountains the structure is such that if an animal knocks it over accidentally the water will drain out, thus necessitating a refilling of the fountain and perhaps a replacement of some of the parts, as often part of them becomes broken when knocked over by the poultry or animals.

Also, it is injurious to the pen for quantities of water to be spilled in it, as sometimes it necessitates a cleaning out of the peat or other material used on the bottom of the pen after water has been spilled on it.

In my invention it is not possible to spill any more water out of the fountain than happens to be in the trough at the moment that it is upset. In other words, none of the water in the Mason type jar can be lost if an animal accidentally knocks over my fountain.

Also, my fountain is so constructed that it can utilize an ordinary regular Mason type jar, thus saving great expense to the operator.

My fountain includes a base to be applied to a regular Mason type jar, this base being preferably made of plastic or a plastic type of material so that it will readily thread onto the Mason type jar in a water-tight manner to prevent leakage and so that it will resist breakage of the jar. This resistance to breakage is caused by the fact that the threads on my plastic type base will not chip off the threads on the Mason type jar when they are applied in the operation of screwing and unscrewing a Mason type jar into my base.

Also, when the structure is accidentally knocked over the plastic type material is somewhat resilient and gives a little, thus softening the blow and reducing the hazard of breakage of the Mason type jar.

Of course, the plastic type base will practically never break, thus eliminating a cause of breakage in the prior existing structures, which have entire glass construction, both of the jar and of the base.

Also, my fountain is economical to manufacture and can be sold cheaply, thus giving a great benefit to the poultry industry which suffers a great loss each year through breakage of glass drinking fountains, which must be replaced at a great expense.

It is not possible or practical to mold threads on the inside of the neck of a glass bottle, as these threads must always be on the outside of the bottle because glass is blown into a cavity mold, thus making it impossible to blow threads on the inside of a glass bottle.

My invention provides the threads on the inside of the plastic type base, which meet and register with the threads on the outside of a regular Mason type jar, thus forming an economical cooperation between the water container and the base that is water-proof and easily applied and will not break the threads of either.

Another advantage of my fountain is that due to the position of the inlet and outlet to the water passage from the source of supply to the trough it is impossible to spill any of the water out of the jar when the structure is accidentally knocked over, as is explained hereinafter. Finally, since the threads of many different sized Mason type jars are the same, it is possible to use a single size of my base alternatively with many different volume or capacity Mason type jars, thus varying the amount of water according to the animal to which it is furnished without the necessity of purchasing additional bases. In other words, my base can fit the threads of a quart Mason type jar as well as a gallon Mason type jar, since the openings and threads of many of the regular Mason type jars of the different sizes is the same.

Other objects and advantages of my invention will be apparent from the following description and claims, the novelty consisting in the features of construction, combination of parts, the unique relations of the members and the relative proportioning, disposition and operation thereof, all as is more completely outlined herein and as is particularly pointed out in the appended claims.

In the accompanying drawings, forming a part of this present specification,

Figure 1 is a vertical side view, partly in section, of my poultry water fountain, showing my preferred embodiment in the completely assembled position.

Figure 2 is a sectional view taken along the lines 2—2 of Figure 1.

Figure 3 is a sectional view taken along the lines 3—3 of Figure 1.

Figure 4 is a sectional view, partly in elevation, on a slightly reduced scale, showing the position and condition of my fountain when it has been accidentally tipped over with the water bottle practically full.

Referring to the drawings, a reservoir in the form of a regular Mason type jar 10 provided with the usual threads 12 and water outlet 14 is used in my invention. My base 16 has a trough 36 provided with slanting sides 18 and a flat trough floor 20 having an opening 22 therein. An upward extension 24 in my base is provided with internal threads 26 of a size to cooperate with the threads 12 of the Mason type jar 10. My base 16 is preferably made of plastic type material so that it will not break when it drops and so that the threads 26 will cooperate to form a water-tight seal with threads 12 of the Mason type jar 10.

My base 16 is provided with a closure or reservoir floor portion 28 which acts as a cap or seal to hold the fluid in the Mason type jar. This closure 28 has a horizontal opening or inlet 30 from the reservoir to a water passageway 32, which is preferably annular and which has a vertical opening or outlet 34 to the trough 36 and which is preferably located adjacent the inlet 30. A blocking means or partition 35 interrupts the continuity of the passageway 32 between the openings 30 and 34. The openings 30 and 34 are thus adjacent to but on opposite sides of the partition 35. Due to the proximity of outlet 34 to inlet 30, water is not spilled out of the jar 10 when it is tipped over.

The water from the outlet 34 enters trough 36 and rises in the trough to a height equal to the top of the opening or outlet 34. It will be noted that this opening 34 is so located that its top is below the rim or top of side 18 of my base 16 so that the water remains below the top of the side 18 of my base 16 and does not spill over.

By this construction, the water in the trough will never rise above a level equal to the top of the outlet 34 and it will always be forced up to this level as water is consumed by the poultry or animals drinking from the fountain.

Should the fountain be tipped over, as shown in Figure 4, there is no way to prevent the amount of water in trough 36 from spilling out, but no more water will be spilled from jar 10 because in any position in which it falls the openings 30 and 34, being together, will prevent the water from escaping from the jar 10.

For instance, if the openings 30 and 34 are at the bottom, as shown in Figure 4, it will be impossible for water to spill out of jar 10 because it would have to go out of inlet 30 and travel uphill along passageway 32, which will be prevented by gravity.

On the other hand, should the openings 30 and 34 be at the top when the fountain is knocked over, it will be impossible to spill any water 38 out of jar 10 because opening 30 is above the level of the water and also outlet 34 is above the level of the water. Should any water pass out of opening 30, if the opening is in the side position, it would merely run to the bottom of the passageway 32 and could not go out of outlet 34, which will be above it.

Similarly, in any of the intermediate positions, water 38 will not spill out of jar 10 due to the position of the openings 30 and 34 and the passageway 32 between them.

The method of operating my fountain is quite simple and obvious. The regular Mason type jar 10 is filled with water and my base 16 is screwed onto it like a cap by means of the interengaging threads 12 and 26. When the base 16 is screwed tightly onto the jar 10 it is only necessary to reverse the position of the parts, placing them in the position shown in Figure 1 and setting the structure in the animal pen. Then the water 38 will run down from the jar 10 through inlet 30, passageway 32 and outlet 34 into trough 36 where it will rise to a level equal to the top of outlet 34 where it will remain until the water is exhausted from jar 10.

Should the fountain be accidentally knocked over, as shown in Figure 4, it is necessary only to set the fountain up into the upright position shown in Figure 1 and then the water 38 will drain down from the jar 10 through the passageway, as described above, to trough 36 where it will rise to the top of the opening of outlet 34 in the same manner described above.

There is no breakage and no necessity of refilling the jar 10 with water when it has been knocked over, as the amount of water in the trough 36 is relatively small.

In this way, where there is a large number of animals or chickens necessitating a great many of these fountains, it is necessary to fill the fountains only at regular intervals, which are readily ascertained by experience. Between these intervals, it is easy to see when any fountains have been accidentally knocked over and the attendant has to merely walk over and set any knocked over fountains in the upright position in order to maintain all of the drinking fountains in perfect working condition.

It is to be understood that the form of my invention herein shown and described is my preferred embodiment and that various changes in the shape, size and arrangement of parts may be resorted to without departing from the spirit of my invention, or the scope of the appended claims.

I claim:

1. In a drinking fountain, a base for a water reservoir, said base comprising: a floor portion for a reservoir; a water trough having a floor portion around said first mentioned floor portion; spaced walls interconnecting said floor portions and forming a water passageway; a partition blocking said passageway; said water passageway being provided with an inlet for water from a reservoir; and said water passageway being provided with an outlet for flow of water from said passageway to said trough, said inlet and outlet being positioned adjacent to but on opposite sides of said partition.

2. A drinking fountain comprising an annular water trough having a floor portion, a water reservoir centrally disposed above said trough and having a floor portion, concentric walls interconnecting said floor portions and forming an annular water passageway around the inner periphery of said trough, a partition blocking said passageway, said reservoir being provided with an opening into said passageway adjacent one side of said partition, and said trough being provided with an opening adjacent the opposite side of said partition.

3. A drinking fountain comprising a reservoir having a floor portion, a drinking trough having a floor portion concentric to said reservoir floor portion, walls interconnecting said floor portions and forming an annular water passageway, a partition interrupting said passageway, said reservoir being provided with an opening into said passageway adjacent one side of said partition, and said trough being provided with an opening from said passageway adjacent the opposite side of said partition whereby water flowing from said reservoir to said trough must flow through substantially the full length of said passageway.

4. A drinking fountain comprising a reservoir having a bottom discharge outlet, a base, said base having a floor portion for closing said reservoir discharge outlet, a water trough surrounding said floor portion, spaced walls interconnecting said trough and said floor portion and forming a water passageway between said floor portion and said trough, a partition blocking said passageway, said reservoir being provided with an opening into said passageway, and said passageway being provided with an opening into said trough, said openings being on opposite sides of but adjacent to said partition.

5. In a drinking fountain, a reservoir having a floor portion, a trough, spaced walls interconnecting said floor portion and said trough and forming a water passageway exending substantially around said floor portion, blocking means interrupting the continuity of said passageway, said reservoir being provided with an opening into said passageway, said trough being provided with an opening from said passageway, said openings being adjacent to but on opposite sides of said blocking means.

WILEY D. MITCHELL.

REFERENCES CITED

The following references are of record in the file of this patent:

UNITED STATES PATENTS

| Number | Name | Date |
|---|---|---|
| 727,597 | Day | May 12, 1903 |
| 987,551 | Chambers | Mar. 21, 1911 |
| 1,023,658 | Klussman | Apr. 16, 1912 |
| 1,467,706 | Collins | Sept. 11, 1923 |